United States Patent [19]
Cole, Jr.

[11] Patent Number: 5,944,464
[45] Date of Patent: Aug. 31, 1999

[54] LOAD RESTRAINING CEILING AND SYSTEM FOR REFRIGERATED VEHICLES

[75] Inventor: Charles W. Cole, Jr., City of Industry, Calif.

[73] Assignee: Utility Trailer Manufacturing Co., City of Industry, Calif.

[21] Appl. No.: 08/873,796

[22] Filed: Jun. 11, 1997

[51] Int. Cl.⁶ ....................................... B60P 7/15
[52] U.S. Cl. ........................... 410/153; 410/143; 410/149
[58] Field of Search ..................... 410/153, 143, 410/144, 145, 149, 151; 211/105.3, 105.5, 105.6; 248/354.1, 354.5, 354.6; 296/24.1

[56] References Cited

U.S. PATENT DOCUMENTS

| | | | |
|---|---|---|---|
| 1,665,439 | 4/1928 | Brown | 410/153 |
| 2,545,251 | 3/1951 | Barettella | 211/105.6 |
| 3,274,967 | 9/1966 | Igave et al. | 410/153 |
| 3,342,142 | 9/1967 | Miller | 410/153 |
| 3,570,412 | 3/1971 | Holman, Jr. | 410/153 |
| 3,767,253 | 10/1973 | Kluetsch | 410/153 X |
| 4,332,515 | 6/1982 | Twyman | 410/149 |
| 4,720,222 | 1/1988 | Nagy et al. | 410/151 |
| 4,824,302 | 4/1989 | Schultheis et al. | 410/151 |
| 5,403,063 | 4/1995 | Sjostedt et al. | 296/181 X |
| 5,507,405 | 4/1996 | Thomas et al. | 296/181 X |

FOREIGN PATENT DOCUMENTS

358225  12/1961  Switzerland .................. 248/354.1

*Primary Examiner*—Stephen T. Gordon
*Attorney, Agent, or Firm*—Lyon & Lyon LLP

[57] ABSTRACT

The load restraining system for refrigerated vehicles having insulated ceiling/roof structures. The ceiling/roof is provided with a downwardly facing ceiling surface having a multiplicity of sockets spaced substantially throughout the ceiling. Vertically extendible poles have a projection on the upper end for engaging a socket and thereby locating the upper end of the pole against horizontal movement in any direction. The lower end of each pole has a foot for engaging the floor in a manner to inhibit horizontal movement in any direction. Numerous poles can be positioned throughout the refrigerated vehicle at virtually infinitely variable locations to restrain loads of different sizes and shapes.

19 Claims, 6 Drawing Sheets fig.1 fig.2

FIG. 7 fig.11 fig.12 fig.13 fig.14

LOAD RESTRAINING CEILING AND SYSTEM FOR REFRIGERATED VEHICLES

This invention relates to a ceiling structure and load restraint system for refrigerated vehicles such as trucks or trailers and, in particular, to refrigerated vehicles in which loads of a variety of different sizes and shapes must be restrained during transit but also must be readily accessible when portions of the loads are to be removed at delivery locations.

It is common practice for enclosed load carrying vehicles, such as trucks and trailers, that carry loads of varying sizes and shapes to be provided with load restraining devices in the vehicle to prevent the loads from shifting during transit. Such load restraining devices often comprise fittings permanently mounted on the interior surfaces of the truck or trailer and poles, bars, nets or the like that attach to those fittings so that the pole, bar, net or the like engages and restrains the load at that location in the truck or trailer during transit and that can be removed easily for access to all or a portion of the load. When the load carrying area of the truck or trailer is not refrigerated, the load restraining fittings that are mounted on the interior surfaces of the truck or trailer may easily comprise a structural portion of the truck or trailer such as the metal vertical posts spaced along the side walls of the truck or trailer and the metal horizontal beams in the ceiling/roof of the truck or trailer. However, for refrigerated trucks or trailers it is more difficult to provide structural members as load restraining fittings on the interior surface because the walls, ceiling and floor must be insulated to prevent excessive heat transfer and any metal posts or beams exposed to the interior would increase the heat transfer. Moreover, most refrigerated trucks and trailers are for carrying foods products and therefore the interior surfaces must be capable of being readily and completely cleaned, which is difficult with conventional load restraining fittings, such as steel tracks with holes or slots (commonly called logistic tracks), that are used in non-refrigerated vehicles.

A specific problem that has been encountered with large refrigerated trailers that are used for delivering a variety of different supplies to franchise-type food purveyors, such as fast food restaurants, home-delivery pizza bakeries and the like, is that such trailers are used to deliver all of the different types of products used at a franchise location, including frozen foods, perishable foods, delivery cartons, paper goods, etc.. which are contained in a variety of different sizes and shapes of boxes or other containers which do not render themselves to being restrained by conventional uniformly spaced restraining devices, such as vertical or horizontal logistic tracks in the sidewalls of the trailer into which horizontal bars are fitted. Moreover, as such a trailer stops at each franchise location for unloading a quantity of each supply, the heights of the stacks of boxes and other containers change whereby the vertical location of each horizontal bar must be changed and, in fact, horizontal bars must be provided at various vertical locations to prevent the boxes or containers shifting within each stack thereof. Furthermore, for such a trailer, all of the different products must be accessible at each franchise location for selecting the needed provisions whereby an aisle is usually provided through most of the length of the trailer, which most typically is 48 feet long, whereby lateral load restraints also must be provided along that aisle. Thus, one possible solution to restraining loads in such refrigerated vehicles for transporting supplies to franchise type locations is to provide conventional vertical poles that can be extended, such as by a screwjack, ratchet or spring-loaded mechanism, but difficulty has been encountered in maintaining the vertical poles in the desired location between the ceiling and floor for various reasons, such as the fact that each vertical pole tends to lift the ceiling a small amount thereby loosening any nearby poles as well as possibly damaging the ceiling. This problem is particularly acute with refrigerated trucks and trailers because conventionally the ceiling/roof is comprised of only a metal sheet as the roof, a plastic sheet as the ceiling and 2" to 5" of foam insulation therebetween and a minimal number of metal beams submerged in the foam insulation that serve to reinforce the complete ceiling/roof assembly.

Thus it is an object of the present invention to provide a load restraining ceiling system for refrigerated vehicles wherein extendible vertical poles may be positioned at virtually any location and will remain in that location while the vehicle is in transit.

A further and more detailed object of the present invention is to provide a refrigerated vehicle with a ceiling structure having a multiplicity of sockets for receiving a top end or projection on a vertically extendible pole at any of the multiplicity of locations of those sockets for providing a virtually infinitely adjustable load restraining system for a refrigerated vehicle. A still further object of this invention is to provide such a ceiling structure that adds to the structural strength of the ceiling/roof without sacrificing thermal insulation.

Other and more detailed objects and advantages of the present invention will appear to those skilled in the art from the following description of the preferred embodiments of this invention, as shown in the attached drawings, wherein:

Figure 1:
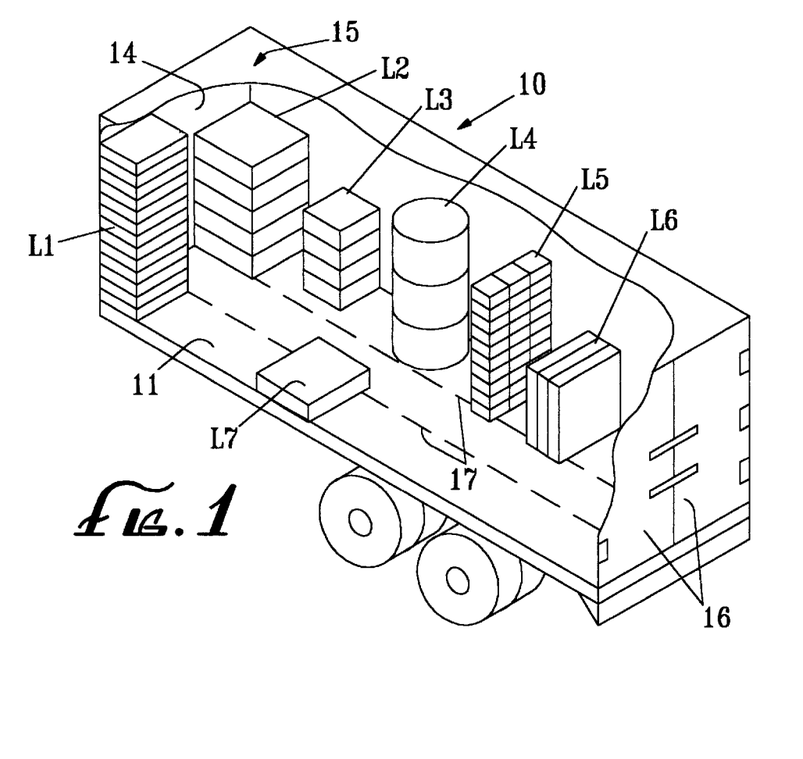
FIG. 1 is a perspective view of a typical refrigerated vehicle, such as a trailer, with a variety of loads located therein of varying sizes and shapes, but for simplicity of illustration the load restraining devices are omitted from the figure.
Figure 2:
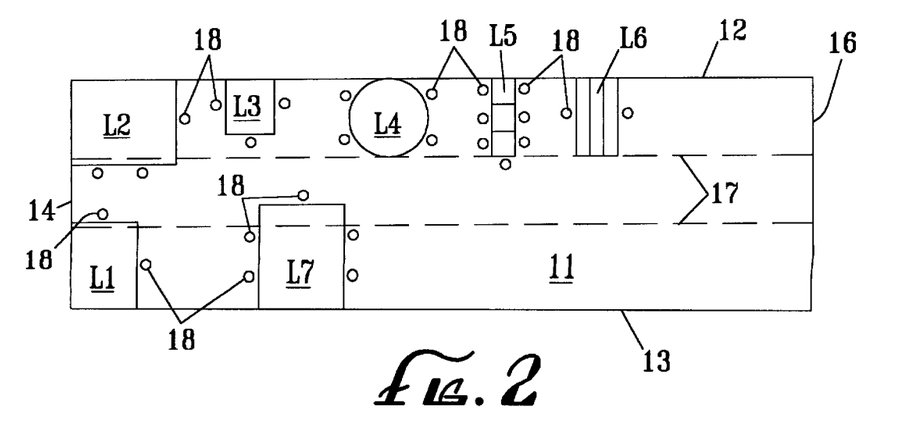
FIG. 2 is a schematic plan view of the refrigerated trailer of FIG. 1 with the loads contained therein, and with the typical locations of the vertical restraining poles illustrated by small circles.

Referring now to FIGS. 1 and 2, a refrigerated truck or trailer 10 includes a floor 11, sidewalls 12 and 13, a front wall 14, a ceiling/roof 15 and rear doors 16 defining a refrigerated cargo space in which a variety of products may be transported that either require refrigeration or can tolerate some refrigeration although not required. The cargo space may be divided into different temperature zones in a conventional manner, which is not shown because it is not an aspect of this invention. The cargo space of vehicle 10 is adapted to contain numerous sizes and shapes of boxes or other containers that comprise the loads to be restrained in the cargo space, such as, a stack of thin flat boxes L1 a stack of large and thicker boxes L2, a stack of smaller boxes L3, a stack of barrel shaped containers L4, three stacks of small boxes L5, three vertically oriented large flat boxes L6, and a single box L7 which, for example, contains fragile goods that cannot have other goods stacked thereon. Dashed lines 17 illustrate a theoretical access aisle for reaching the loads L1–L7, although some loads may encroach upon a portion of that aisle, where necessary. As shown in FIG. 2, a multiplicity of vertically extendible poles 18 (illustrated by the small circles) are strategically positioned around each load L1–L7 for restraining that load in that position in the trailer 10. Since each pole 18 extends from the floor 11 to the ceiling/roof 15, as will be described more fully below, each load is completely restrained regardless of the height of the stack of the boxes or other containers or the number of such stacks. For example, each of the three stacks of boxes L5 has a pole 18 on each side and another pole 18 is positioned at the aisle whereby all three stacks are restrained. However, this ideal location of each of the multiplicity of poles 18 for individually restraining the various different sizes and shapes of loads L1–L7 is only possible by reason of being able to position each pole 18 in any desired location and by assuring that the location of each pole will not change by the top or bottom moving or dislocating during the installation of other poles or during transit, which features are accomplished by the present invention.

Figure 3:
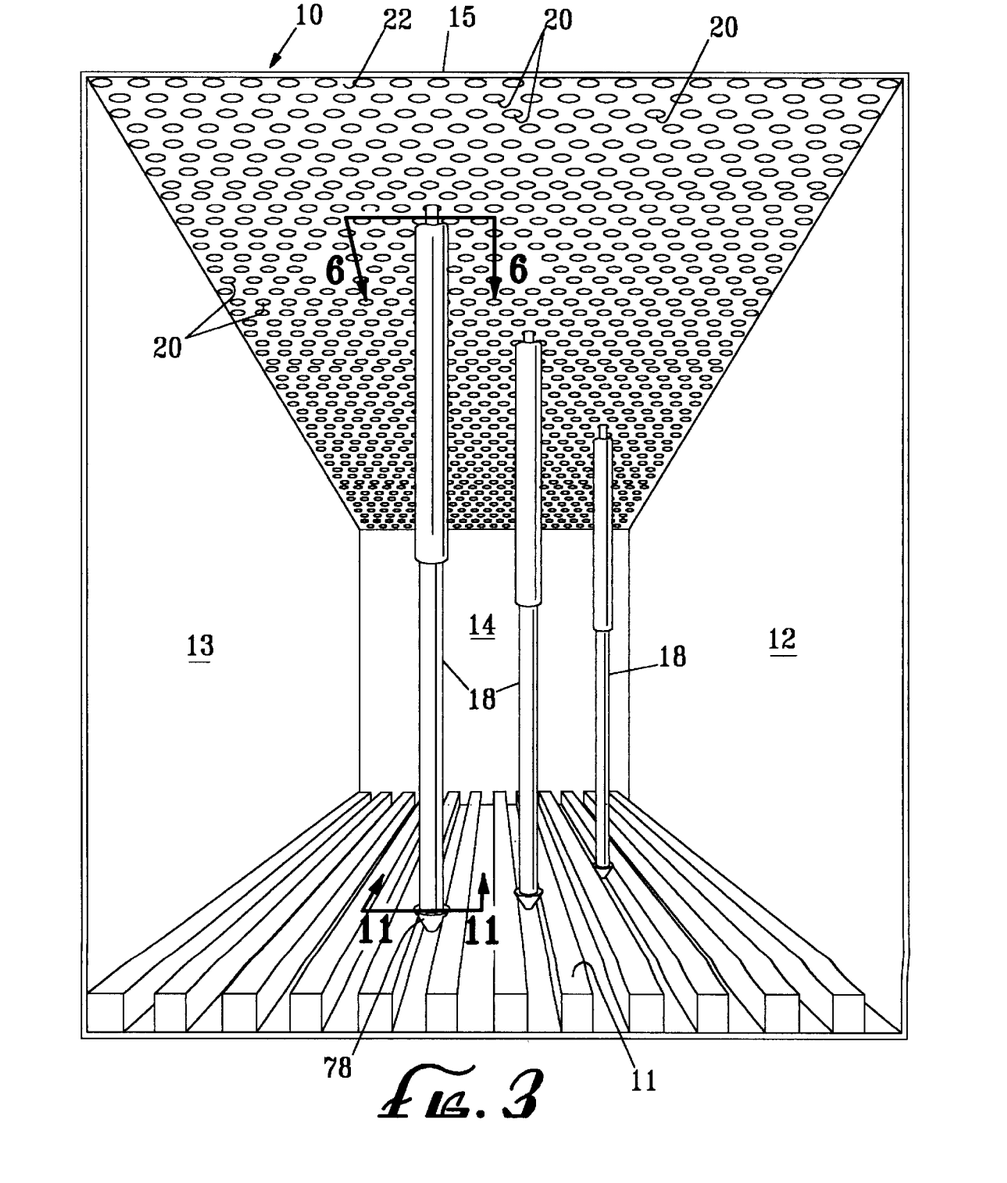
FIG. 3 is a perspective end view of the interior of the trailer of FIG. 1 without the loads.

Referring now to FIG. 3, the interior cargo space of a trailer 10 is shown in perspective, without any of the loads L1–L7, but with three vertically extendible poles 18 extending the floor 11 and the ceiling/roof 15. The floor 11 diagrammatically illustrated in FIG. 3 is a typical convention floor for a refrigerated vehicle and comprises substantially square corrugations of, for example, aluminum extrusion to support any load and yet allow cold air circulation under the load in the troughs of the corrugations. The ceiling/roof 15 is a unitary structure, which will be described in more detail below, that includes a multiplicity of sockets 20 in the ceiling surface 22. For continuity, it is preferred that the ceiling surface 22 be formed by a single sheet or a plurality of sheets of the same material with the multiplicity of holes 20 relatively uniformly spaced throughout the entire ceiling surface 22 but this invention also contemplates that the sheets with sockets 20 may be provided in only those portions of the ceiling surface 22 that may be used as a location for a load restraining pole 18. The lower end of each pole 18 engages the floor and is provided with an end device that will resist movement of the lower end of the pole 18 with respect to the floor 11, as will be described more fully in connection with FIGS. 11–14.

Figures 4, 5:
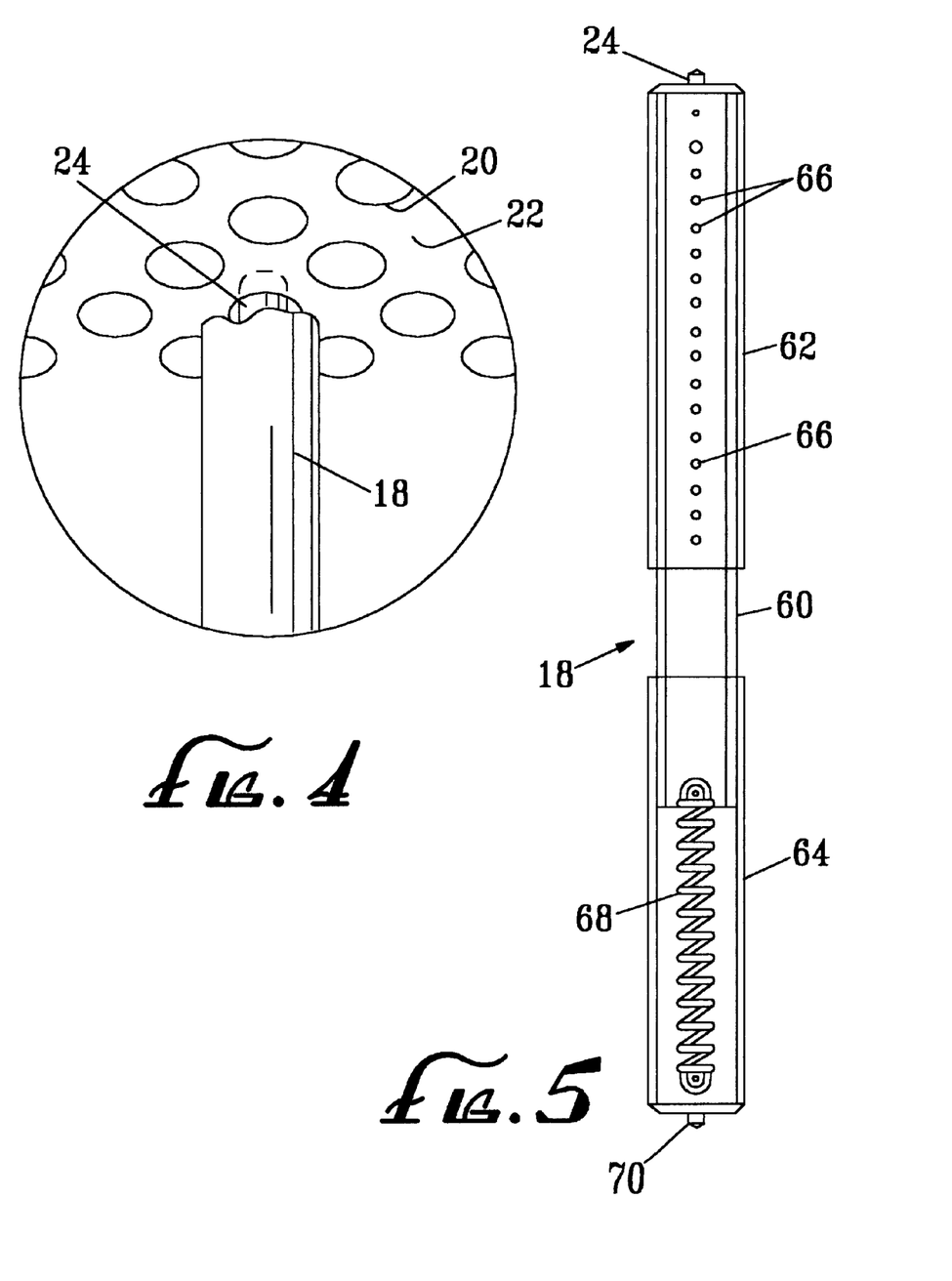
FIG. 4 is an enlarged view of a portion of the ceiling of a refrigerated trailer shown in FIG. 3.
FIG. 5 is an elevation view of a typical load restraining pole that is extendible.
Figure 6:
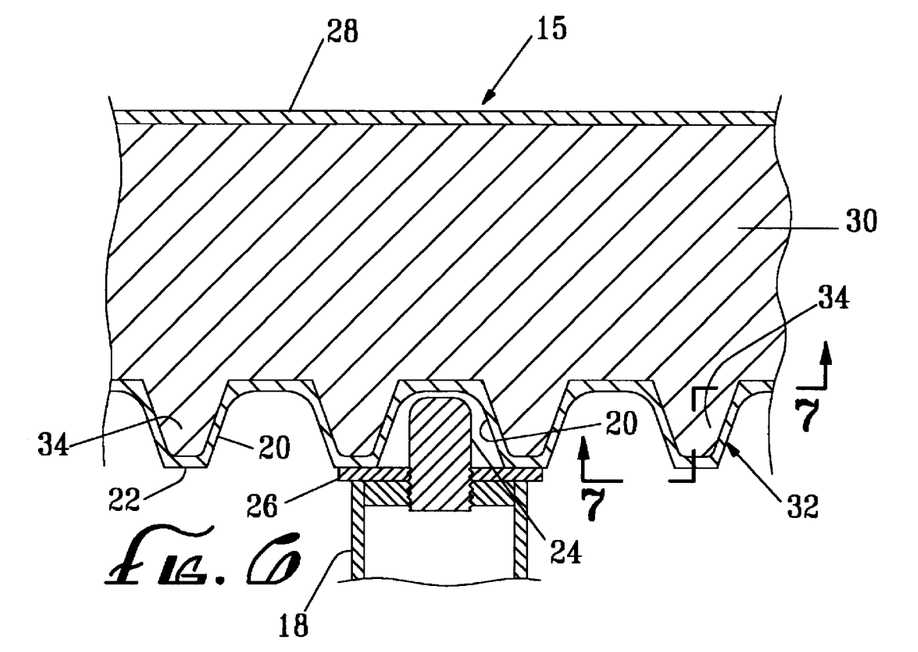
FIG. 6 is an enlarged sectional view of the ceiling structure and a pole taken along the line 6—6 in FIG. 3.

As shown in FIGS. 3 and 4, where a portion of the upper end of each pole 18 is broken away for illustration purposes, and as shown in FIG. 6, the upper end of each pole 18 is provided with a protrusion or stud 24 that is adapted to extend into a socket 20 in the ceiling surface 22 for positively locating the upper end of the pole 18 in all horizontal directions. The upper end of pole 18 is also provided with a washer or flange 26 surrounding the stud 24 for engaging the ceiling surface 22. The flange 26 may be of any desired shape and size that engages an adequate area of a ceiling surface 22 for distributing the load imposed by the upward force of the pole 18, such as by extending the pole. As shown in FIG. 6, the flange 26 extends horizontally a sufficient distance to nearly reach each of the adjacent sockets 20 but, for example, the flange 26 could be much larger to extend over the adjacent sockets 20 to engage a larger area of the ceiling surface 22. Further, the flange 26 may be of any desired material that is compatible with the material forming the ceiling surface 22 and sockets 20 so as to minimize any possible damage to the material forming the ceiling surface 22 and sockets 20.

Figure 7:
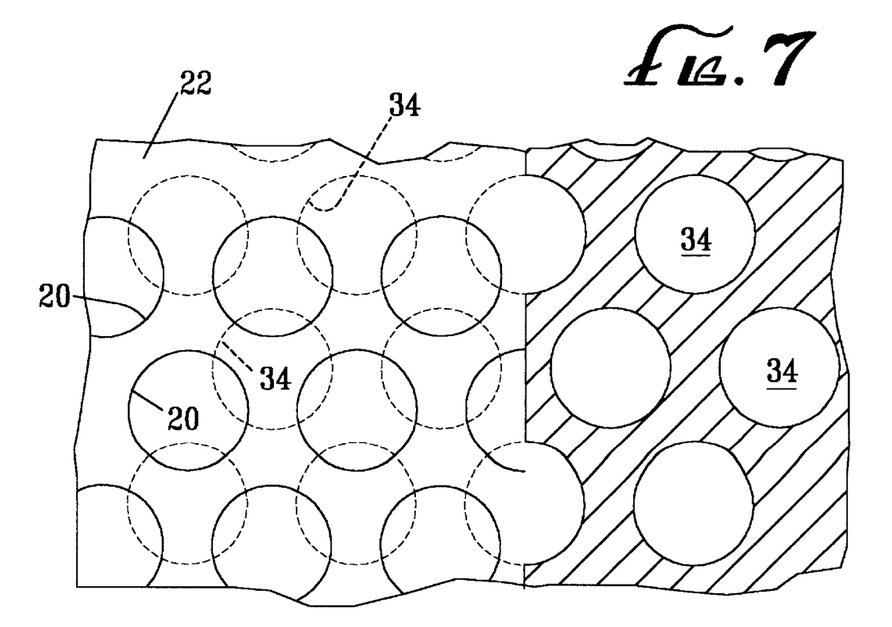
FIG. 7 is a partial sectional view of the ceiling structure taken along the line 7—7 in FIG. 6.

In the embodiment of this invention illustrated in FIGS. 6 and 7, the ceiling/roof 15 includes a conventional roof sheet 28, usually of aluminum, and a thick layer of foam insulation 30 between the roof sheet 28 and a ceiling panel 32. The foam 30 preferably is foamed in place in a conventional manner and may be of any desired thickness which typically varies between 2 inches and 5 inches depending on the amount of thermal insulation required. The ceiling panel 32 preferably is a preformed plastic honeycomb panel that is provided with downwardly facing sockets 20 uniformly spaced in rows and having corresponding upwardly facing depressions 34 sounding the sockets 20 that are also uniformly spaced in rows but offset from the sockets 20. The depressions 34 provide a receptacle for the foam 30 for securely fastening the panel 32 to the foam and in turn the foam 30 securely adheres to the roof sheet 28 thereby forming an integral ceiling/roof structure 15. Since the panel 32 is formed of a plastic, the thermal insulation characteristics of the ceiling are enhanced rather than being reduced, as would occur with a metal ceiling panel. While the sockets 20 and the depressions 34 are illustrated in FIGS. 6 and 7 as being circular and uniform, their shape may vary as a result of the manufacturing process and, in fact, in the preferred material for panel 32, the sockets 20 and depressions 34 are not perfectly circular, the sides thereof are not uniformly tapered, and the wall thicknesses are not completely uniform, although such characteristics are relatively uniform. At present, the preferred embodiment of panel 32 is a NorCore plastic honeycomb paneling manufactured by Norfield Corporation, Danbury, Conn., in various plastics such ABS, polycarbonate, polystyrene and Uvex. It is preferred that the panel 32 be of a vertical thickness of about ¾ inch to provide the desired structural strength and adequate diameter and depth of the sockets 20 although other thicknesses may be used.

Figure 8:
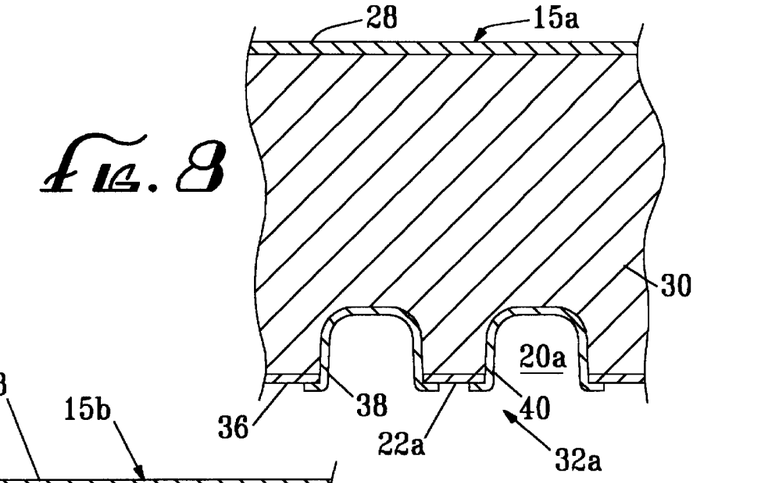
FIG. 8 is a horizontal sectional view similar to FIG. 6 but illustrating a modified embodiment of the ceiling structure.

FIG. 8 illustrates a modified embodiment of a ceiling/roof 15a in which the ceiling panel 32a is formed of a flat ceiling sheet 36 having a multiplicity of holes 38 punched therein in any desired pattern and with a preformed socket cup 40 installed in each hole 38 to thereby form a multiplicity of sockets 20a in the ceiling surface 22a. Again, foam 30 is foamed in place between the roof sheet 28 and the ceiling panel 32a to securely fasten the roof sheet 28 and ceiling panel 22a to the foam core. The ceiling sheet 36 and socket cups 40 may be formed of any desired material, such as metal or plastic, and the cups 40 may be secured to the sheet 36 by any desired means. such as press fitting, welding or adhesive.

Figures 9, 10:
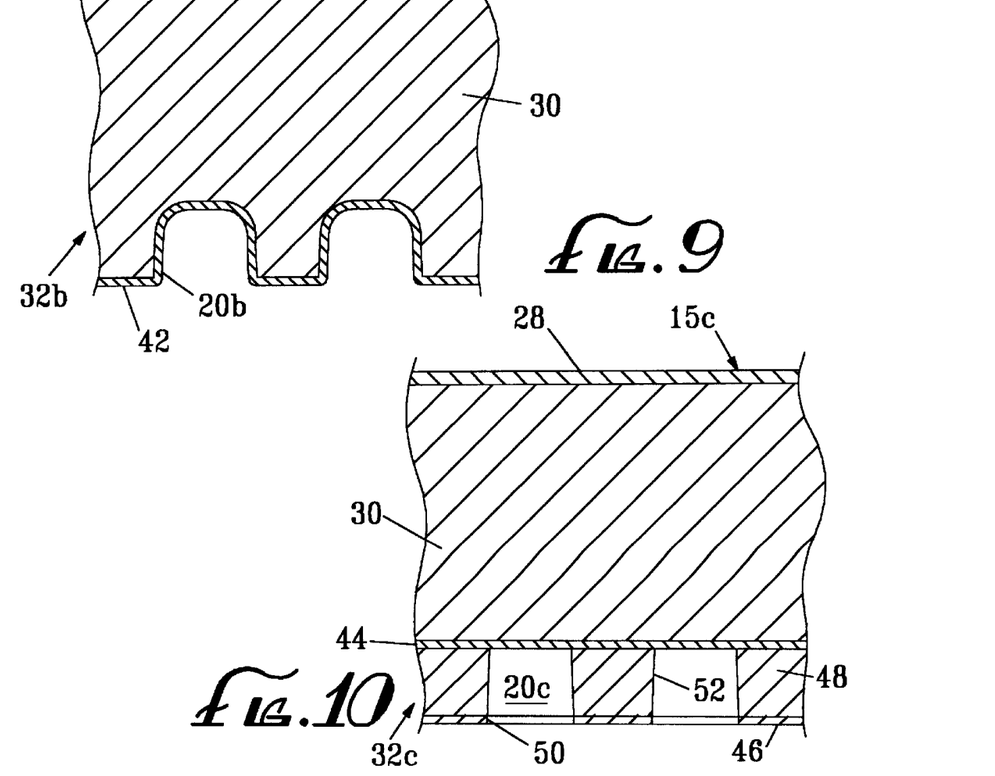
FIG. 9 is a horizontal sectional view similar to FIG. 6 but illustrating another modified embodiment of the ceiling structure.
FIG. 10 is a horizontal sectional view similar to FIG. 6 but illustrating still another modified embodiment of the ceiling structure.

FIG. 9 illustrates another modified ceiling/roof 15b wherein the ceiling panel 32b is formed of a single sheet 42 of any desired material, such as metal or plastic by forming a multiplicity of cup shaped sockets 20b in any conventional manner. Again, the foam 30 secures the roof sheet 28 to the ceiling panel 32b to complete the structure.

FIG. 10 illustrates another ceiling/roof 15c in which the ceiling panel 32c is formed of two separate sheets 44 and 46 with a core 48 sandwiched therebetween. The lower or ceiling sheet 46 is provided with a multiplicity of space holes 50 and the core 38 is provided with a corresponding number of mating holes 52 to thereby form a multiplicity of sockets 20c. The sheets 44 and 46 and the core 48 may be formed with any desired material and may be adhered together in any desired manner. The holes 50 and 52 may be formed before or after laminating the core 48 between the sheets 44 and 46. Again, the foam 30 adheres to and connects the roof sheet 28 and the ceiling panel 32c to form an integral ceiling/roof 15c.

Each of the modified forms of the ceiling/roof structure shown in FIGS. 8, 9 and 10 provides the multiplicity of ceiling sockets similar to the ceiling/roof 15 of FIG. 6 for receiving the stud 24 of a pole 18 for locating that pole in all horizontal directions and also a downwardly facing ceiling surface to be engaged by the flange 26 of the pole 18.

Referring now to FIG. 5, a typical conventional extendible pole 18 is illustrated wherein a central tube 60 has upper and lower outer tubes 62 and 64 slidably mounted thereon. Upper tube 62 is provided with a plurality of holes 66 along its length for being engaged by a pin or the like that also engages central tube 60 for adjusting the length of the pole 18. The lower outer tube 64 is connected to the central tube 60 by a spring 68 for resiliently extending the lower outer tube 64 downwardly from the central tube 60. Thus, the pole 18 is adjustable in overall length by movement of the upper tube 62 relative to the central tube 60 and the overall length is resiliently extended or retracted by a spring 68. As a result, the pole 18 can be adjusted to the appropriate length for the distance between the floor 11 and ceiling/roof 15 of the trailer 10 and a resilient force is applied by spring 68 to maintain the pole 18 in the desired position. Since the stud 24 of pole 18 is positioned in a socket 20, when the pole is placed in a load restraining position, the resilient force applied by spring 68 need not be very large because the upper end of the pole 18 will not shift horizontally as a result of shifting loads or relative movement among the floor 11, sidewalls 12 and 13 and ceiling/roof 15, as normally occurs in cargo trailers of this type during transit. A projection 70 on the lower end of the pole 18 may be fitted with any appropriate device for mating with the floor 11 to inhibit horizontal movement of the bottom end of the pole 18.

Figures 11, 12, 13, 14:
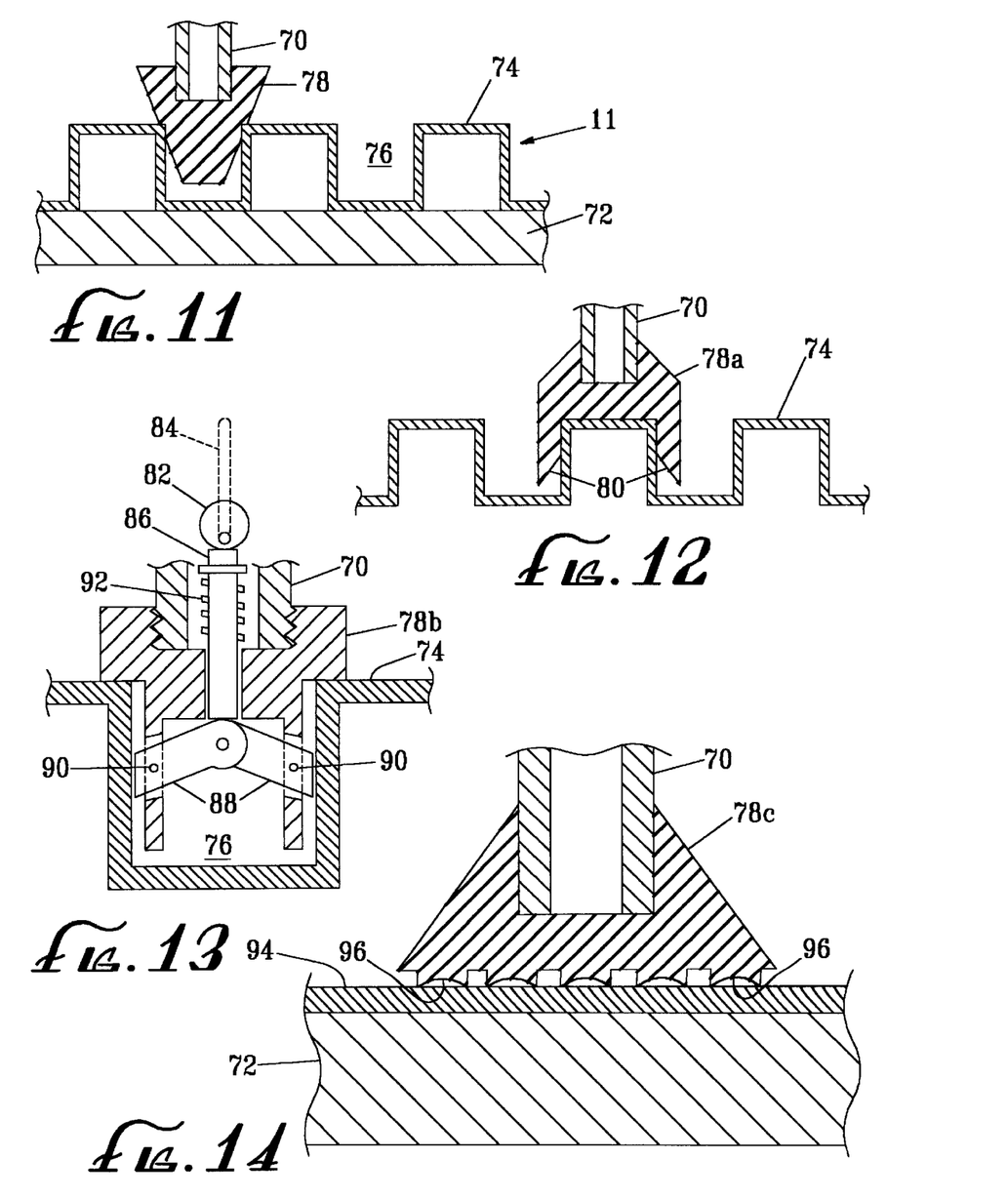
FIG. 11 is an enlarged sectional view of the lower end of a vertically extendible pole engaging the floor of the trailer taken along the line 11—11 as shown in FIG. 3.
FIG. 12 is a horizontal sectional view similar to FIG. 11 but illustrate modified form of the lower end of the vertically extendible pole.
FIG. 13 is a horizontal sectional view similar to FIG. 11 but illustrating another modified form of the lower end of the vertically extendible pole.
FIG. 14 is a horizontal sectional view similar to FIG. 11 but showing a different form of the trailer floor and another modified form of the lower end of the vertically extendible pole.

Referring now to FIG. 11, a typical floor 11 of a refrigerated trailer 10 is illustrated and comprises a subfloor 72 that may be of wood or other material and a corrugated flooring 74 which typically is aluminum extruded in the desired shape. As mentioned previously, the upper surface of flooring 74 supports the loads and spaces 76 between those upper surfaces allow circulation of refrigerated air beneath the loads. As illustrated in FIGS. 3 and 11, a projection 70 on the bottom end of pole 18 may be provided with a rubber foot 78 having a frusto-conical shape to fit in the space 76 between the vertical leg portions of the flooring 74. In this manner, the foot 78 resiliently and frictionally engages the flooring to prevent any lateral movement and inhibit any longitudinal movement of the pole 18 along the length of the trailer 10.

FIG. 12 illustrates a modified form of rubber foot 78a mounted on projection 70 at the bottom of a pole 18 for engaging the flooring 74. Foot 78a has a U-shaped bottom for tightly fitting over the upwardly extending convolution of the flooring 74. Tapered portions 80 are provided on the bottom inside ends of the U-shaped portion of foot 78a for facilitating the positioning of the foot 78a on the flooring 74.

FIG. 13 illustrates another embodiment of a foot 78b for fitting in the space 76 of the square corrugated flooring 74. Foot 78b has an eccentric cam 82 rotatably mounted in projection 70 and attached to a handle 84 for causing a pin 86 to reciprocate vertically in the foot 78b and thereby cause a pair of shoes 88 to pivot about pins 90 to extend and engage the sidewalls of a space 76 in flooring 74. A spring 92 is provided on pin 86 for retracting pin 86 when the lever 84 is moved to the vertical position, thereby allowing the shoes 88 to retract. Thus, the foot 78b on projection 70 of a pole 18 can be selectively locked in position to prevent longitudinal movement of the lower end of the pole 18.

FIG. 14 illustrates a different type of flooring for the floor 11 of the trailer 10, namely, a flat sheet 94, such as aluminum, mounted on a subfloor 72 of any desired material. To inhibit horizontal movement of the lower end of pole 18 on the flat flooring 94, the bottom projection 70 on pole 18 is provided with a foot 78c of a resilient material such as rubber. The bottom surface of foot 78c may be provided with a plurality of small suction cups 96 for gripping the flat flooring 94 to prevent horizontal movement of the bottom end of the pole 18.

The operation and features of the present invention will now be described in connection with the presently anticipated principal use thereof, namely, in a refrigerated trailer 10 used for transporting a variety of different products to several different locations, such as franchise-type fast food restaurants and food delivery services, but it will be readily understood by those skilled in the art that the invention is applicable to numerous other uses. The trailer 10 is loaded at a warehouse with numerous types of products, such as loads L1–L7, and normally would be nearly filled rather than only partially filled as shown in FIGS. 1 and 2. An aisle illustrated by dashed lines 17 is left between the loads through the middle of the trailer 10 for access to any of the numerous different products. Vertically extendible poles 18 are installed at strategic locations surrounding each side of a load that is not restrained by a wall of the trailer 10. If the particular load or stack is likely to shift because of its weight, size, container shape, etc., more than one pole 18 can be used on each exposed side. Each pole 18 is installed by first adjusting the pole to approximately the proper length for extending between the floor 11 and ceiling/roof 15 when the spring 68 is biased a sufficient amount to provide an adequate biasing force to hold the pole 18 in its final position. Each pole 18 then is installed by compressing the pole to reduce its length to less than the distance between the floor 11 and ceiling/roof 15 and then either the lower end of the pole is placed in the desired location or the upper end is place in the desired location with the stud 24 positioned in a socket 20, followed by positioning the opposite end in a nearly vertically aligned location and allowing the pole to expand to extend between the floor 11 and ceiling/roof 15. If a first installation of a given pole 18 is not substantially vertical or is not sufficiently close to the load to adequately restrain the load, the upper or lower end of the pole can be moved to a more appropriate position by merely compressing the pole again. Once all of the poles 18 are in the proper positions, as shown in FIG. 2, the trailer can be moved from the warehouse to a delivery location where access to any one or more of the products, such as loads L1–L7, may be achieved by the aisle 17 and removing one or more the poles 18 that are restraining that load. After all of the desired products are delivered to that location, the poles 18 are reinstalled in the same manner to restrain the remaining loads. By this arrangement, each of the loads is physically restrained in the trailer 10 for transit but is readily accessible for local delivery by removing a pole. The ceiling/roof 15 is of a composite integral structure that is properly insulated without the loss of thermal insulation that would otherwise result from a heavy roof/ceiling structure constructed of metal tracks and/or beams that would be necessary to resist the vertical force of the poles that are not horizontally restrained by the sockets 20 of the present invention. Further, the ceiling structure with a multiplicity of sockets has virtually infinite adjustment of the location of each load restraining pole to thereby accommodate loads of any size, shape or other characteristic without providing a ceiling structure of tracks or the like to fit specific size and shape requirements of the loads to be restrained.

While various embodiments and modifications of this invention have been specifically described, it will be readily apparent to those skilled in the art that various equivalents and substitutes for the elements of each embodiment and modification may be adopted without departing from the scope of this invention, such as, for example other forms of structures of the ceiling/roof 15, other forms of the vertically extendible pole 18 such as screw-type or jack-type, other forms of the foot 78 for the pole 18 and the like, without departing from the present invention.

What is claimed:

1. In a load restraining system in a refrigerated vehicle, which system includes vertical poles that are extendable and retractable between a ceiling/roof structure and a floor of the vehicle, an improvement comprising;

said ceiling/roof structure comprised of a metal roof sheet, a ceiling panel spaced downwardly from said metal roof sheet, and insulating foam foamed in place between said metal roof sheet and said ceiling panel, said insulating foam adhering to said metal roof sheet and ceiling panel and solidifying for forming a rigid connection therebetween, and comprising a composite structure between said metal roof sheet and said ceiling panel;

said ceiling panel forming at least a portion of the ceiling/roof structure above where loads are to be restrained by the vertical poles, said ceiling panel having an upwardly facing surface with an irregular shape with depressions for receiving said insulating foam for providing backing support for said ceiling panel and for preventing shifting of said ceiling panel relative to the solidified foam.

said ceiling panel having a downwardly facing surface with a multiplicity of spaced sockets in said surface, each said socket having a depth and width of substantially the same depth and width, respectively, of other said sockets, and each of the vertical poles having an upper end with a protrusion for extending into a said socket for establishing a fixed location of an upper end of the vertical pole and with an upper surface surrounding said protrusion for engaging said downwardly facing surface of said ceiling panel.

2. The load restraining system of claim 1, wherein said ceiling panel comprises a flat sheet with a hole for each said socket, and a cup-shape member fixed in each said hole for forming each said socket.

3. The load restraining system of claim 1, wherein said ceiling panel comprises a flat sheet with a cup physically deformed into said flat sheet for each said socket.

4. The load restraining system of claim 1, wherein said lower end of each said pole has a foot member, said foot member comprising a wedge shaped resilient member for engaging a groove in the floor of the vehicle.

5. The load restraining system of claim 1, wherein a lower end of each said pole has a foot member, said foot member comprising a U-shaped resilient member for engaging a ridge in the floor of the vehicle.

6. The load restraining system of claim 1, wherein a lower end of each said pole has a foot member, said foot member comprising a mechanism for mechanically and selectively wedging a shoe in a groove in the floor of the vehicle.

7. The load restraining system of claim 1, wherein a lower end of each said pole has a foot member, said foot member comprising a resilient member having suction cup means on a bottom surface for engaging the floor of the vehicle.

8. The load restraining system of claim 1, wherein said ceiling panel is joined to said metal sheet solely by said insulating foam.

9. The load restraining system of claim 1, wherein said ceiling panel comprises a formed plastic sheet having said depressions formed by spaces between said sockets, which depressions are filled with said insulating foam.

10. In a load restraining system in a refrigerated vehicle, which system includes vertical poles that are extendable and retractable between a ceiling/roof structure and a floor of the vehicle, an improvement in the ceiling/roof structure comprising;

a ceiling panel forming at least a portion of the ceiling/roof structure above where loads are to be restrained by the vertical poles, said ceiling panel having a downwardly facing surface with a multiplicity of spaced sockets in said surface, said ceiling panel having an upwardly facing surface with depressions formed between said sockets, a metal roof sheet spaced above said ceiling panel and substantially parallel to said downwardly facing surface, and insulating foam foamed in place and filling the space between said metal roof sheet and said ceiling panel, said insulating foam adhering to and joining said metal roof sheet and said ceiling panel when solidified with said foam filling said depressions.

11. The load restraining system of claim 10, wherein said ceiling panel comprises a formed plastic sheet having said depressions formed by spaces between said sockets.

12. The load restraining system of claim 10, wherein said ceiling member comprises a flat sheet with a hole for each said socket, and a cup-shape member fixed in each said hole for forming each said socket.

13. The load restraining system of claim 10, wherein said ceiling member comprises a flat sheet with a cup physically deformed into said flat sheet for each said socket.

14. The load restraining system of claim 10, wherein a lower end of each said pole has a foot member, said foot member comprising a wedge shaped resilient member for engaging a groove in the floor of the vehicle.

15. The load restraining system of claim 10, wherein a lower end of each said pole has a foot member, said foot member comprising a U-shaped resilient member for engaging a ridge in the floor of the vehicle.

16. The load restraining system of claim 10, wherein a lower end of each said pole has a foot member, said foot member comprising a mechanism for mechanically and selectively wedging a shoe in a groove in the floor of the vehicle.

17. The load restraining system of claim 10, wherein a lower end of each said pole has a foot member, said foot member comprising a resilient member having suction cup means on a bottom surface for engaging the floor of the vehicle.

18. The load restraining system of claim 10, wherein said ceiling panel is joined to said metal sheet solely by said insulating foam.

19. The load-restraining system of claim 10, wherein each of the vertical poles has an upper end with a protrusion for extending into a said socket for establishing a location of an upper end of the vertical pole and with an upper surface surrounding said protrusion for engaging said downwardly facing surface of said ceiling panel.

* * * * *